Feb. 28, 1933.  C. W. HANSELL  1,899,503
ELECTROMECHANICAL VIBRATOR
Filed May 5, 1927

INVENTOR
C. W. HANSELL
BY
ATTORNEY

Patented Feb. 28, 1933

1,899,503

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

ELECTROMECHANICAL VIBRATOR

Application filed May 5, 1927. Serial No. 189,161.

This invention relates to electro-mechanical vibrators and more particularly to piezo-electric crystals for relatively low frequency oscillation.

It has been very difficult heretofore to use a piezo-electric crystal for oscillation at low frequencies. This has been true largely because of the fact that when a crystal is arranged to vibrate in the conventional manner its frequency of vibration depends upon the mass per unit of volume of the crystal, and only slightly upon the total mass, in consequence of which such large crystals are needed that they are difficult to make and difficult to bring into oscillation. If the frequency of vibration is made to depend more directly upon the total mass of the crystal lower frequencies may be obtained merely by moderately increasing the size of the crystal.

It is an object of my invention to reduce the natural frequency of vibration of a piezo-electric crystal. It is a further object of my invention to make the natural vibration frequency of such crystals more dependent upon overall dimension.

To accomplish these objects I cause the crystal to oscillate much like a tuning fork. The resulting cantilever beam type of flexure is characterized by tensile stress at one side and compressive stress at the other side, and according to my invention I cause opposite stresses at opposite sides of the crystal by energizing the crystal with a plurality of electrodes of different polarities between which there flow electric fields in proper direction to cause the opposite stresses desired. In its simplest form the crystal may be placed with its sides between two electrodes of like polarity, and its end near a third electrode of opposite polarity.

Figure 1:
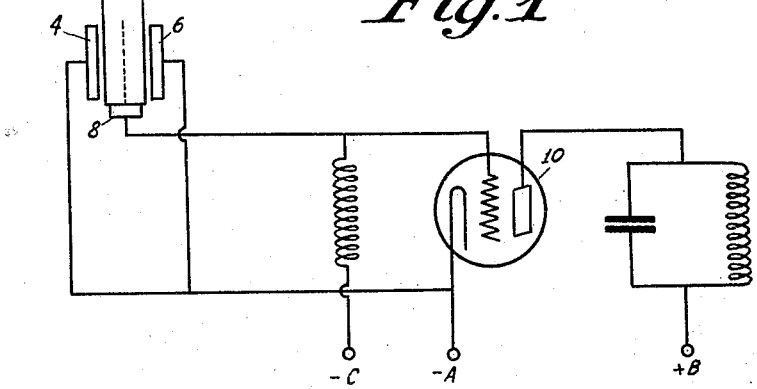

The invention is more fully disclosed in the following specification which is accompanied by a drawing in which:

Figure 1 indicates my invention in simplest form; and

Figure 2:
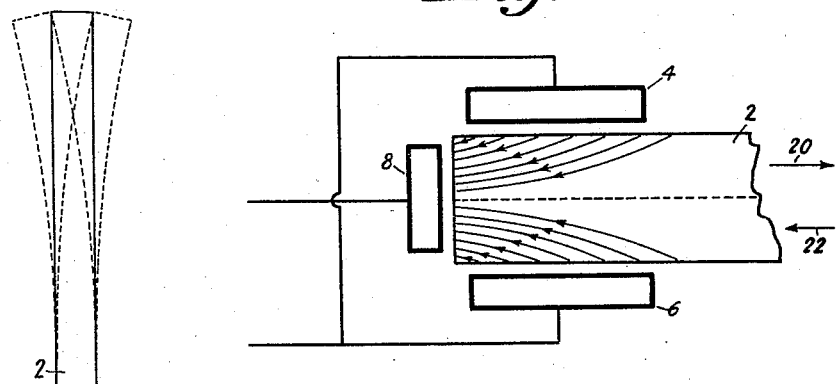

Figure 2 is a fragmentary detail of one end of the crystal shown in Figure 1.

Referring to Figures 1 and 2 a crystal 2 is freely supported or clamped between electrodes 4 and 6 in a vertical, horizontal, or other convenient position. These electrodes are electrically connected to one another and to an alternating current source, here exemplified by a crystal controlled vacuum tube oscillator 10. Adjacent the end of the crystal 2 is a third electrode 8, which is connected to the opposite terminal of the alternating current source. By the arrangement shown the crystal 2 is made to vibrate in flexure, that is, much like a tuning fork.

For the probable explanation of the result obtained attention is called to Figure 2, which represents the stationary end of the crystal. Electric fields progress simultaneously from the sides to the end of the crystal, or vice versa. The transverse component of the electric field moving from the upper side towards the center causes the material of the crystal to expand, as indicated by the vector 20, whereas the electric field progressing from the other side of the crystal towards the center has an upward transverse component which causes the material of the lower part of the crystal to contract. During the next half-cycle of alternating current the electric fields progress from the electrode 8 to the electrodes 4 and 6, so that the transverse force components are reversed, and in this case the vectors 20 and 22, representing the direction of strain of the crystal, are reversed. In this way the free end of the crystal is brought into oscillation.

As a specific example of the effect of vibrating a crystal according to my method it may be stated that in one case a crystal having a fundamental frequency of a million when excited between two electrodes in the ordinary manner has a fundamental frequency of the order of only 50,000 when excited as herein disclosed.

The foregoing is described by way of illustration and not limitation of my invention, which I claim is:

1. A piezo-electric resonator having a piezo-electric body adapted to produce flexural vibrations, a pair of electrodes mounted adjacent to two side faces of said body, and a third electrode mounted adjacent and substantially parallel to an end face of said body, two of said electrodes being of the same polarity, said resonator projecting freely into space beyond said electrodes whereby said free end vibrates flexurally relative to the portion of the crystal mounted between said electrodes.

2. A piezo-electric resonator having a piezo-electric body adapted to produce flexural vibrations, a pair of electrodes mounted adjacent to two side faces of said body, and a third electrode mounted adjacent and substantially parallel to an end face of said body, means connecting said pair of electrodes together, and means to connect an alternating current circuit to said pair of electrodes and said third electrode, said piezo-electric resonator having an end projecting freely into space beyond the portion thereof adjacent which said electrodes are mounted, whereby said free end vibrates flexurally relative to the portion mounted between said electrodes.

3. A piezo-electric resonator comprising in combination a rod of piezo-electric material, a pair of electrodes connected to two opposite side faces of said rod at only one end thereof, a third electrode connected to a face of said end of said rod, said rod being of a length substantially greater than that of the electrodes, whereby the other end of said rod projecting freely into space is uninfluenced by electric fields between said third electrode and each of said pair of electrodes, said electric fields reacting upon said rod to vibrate the same flexurally.

4. A piezo-electric resonator comprising in combination a rod of piezo-electric material, a pair of electrodes connected to two opposite side faces of said rod at only one end thereof, a third electrode connected to a face of said end of said rod, said rod being of a length substantially greater than that of the electrodes and projecting freely into space beyond said electrodes, whereby the other end of said rod is uninfluenced by electric fields between said third electrode and each of said pair of electrodes, each of said electric fields having a component which is opposite in direction to a component of the other electric field, whereby to cause the said rod to vibrate flexurally.

5. Apparatus for producing continuous electrical oscillations at substantially a constant frequency comprising a piezo-electric crystal having a free mechanical end adapted to vibrate like the prong of a tuning fork when set into vibration, a substantially fixed end, and, means for applying electric fields having components which are in opposite directions to the relatively fixed end of said crystal causing a maximum of oscillation at the mechanically free end of the crystal and substantially no vibration at the excited end of the crystal.

6. In a system utilizing an elongated piezo-electric crystal supported at one end between a plurality of electrodes and being unsupported at its other end, the method of causing the crystal to vibrate continuously at its unsupported end which includes applying electric fields on opposite sides of said crystal towards one end thereof, whereby said crystal vibrates with respect to its supporting end.

7. In apparatus utilizing an elongated piezo-electric crystal fixed at one end between a plurality of electrodes, the method of obtaining relatively low frequency resonant continuous oscillation of the crystal at its unsupported end with respect to its fixed end which includes applying electric fields from opposite sides of said crystal towards one end thereof, the position of application of the fields being adjacent the fixed end of the crystal whereby the unsupported end of the crystal vibrates with respect to the fixed end of said crystal.

CLARENCE W. HANSELL.